United States Patent [19]
Myers et al.

[11] 3,746,267
[45] July 17, 1973

[54] HIGH VISCOSITY DISSOLVER

[76] Inventors: Claude K. Myers; Gary A. Myers, both of 8376 Salt Lake Avenue, Bell, Calif. 90201

[22] Filed: Aug. 26, 1971

[21] Appl. No.: 175,214

[52] U.S. Cl............... 241/46.11, 241/236, 259/104
[51] Int. Cl.... B02c 13/18, B02c 13/20, B02c 18/10
[58] Field of Search...................... 241/46.06, 46.08, 241/46.11, 46.17, 187, 191, 236; 259/104

[56] References Cited
UNITED STATES PATENTS

| | | | |
|---|---|---|---|
| 3,648,986 | 3/1972 | Sohn | 259/104 |
| 2,012,680 | 8/1935 | Hammes | 241/46.06 |
| 514,358 | 2/1894 | Grant | 259/104 |
| 3,244,410 | 4/1966 | Myers | 416/122 |
| 3,342,459 | 9/1967 | Myers | 259/104 |
| 345,408 | 7/1886 | Birge | 241/187 X |

*Primary Examiner*—Donald G. Kelly
*Attorney*—Harris, Kern, Wallen & Tinsley

[57] ABSTRACT

A dissolver for reducing blocks of material such as bales of rubber, resin and plastic, to small particle size, particularly suitable for preparing high viscosity solutions and dry particle mixtures. A container with a low-speed sweep shaft driving one or more sweep cutter shafts having overlapping cutter blades, with the shafts and blades arranged to provide a barrier in the container to larger chunks of material. Variable speed drives for the sweep and cutter shafts for controlling shaft speeds and directions of rotation.

10 Claims, 3 Drawing Figures

Patented July 17, 1973

3,746,267

3,746,267

HIGH VISCOSITY DISSOLVER

This invention relates to dissolving and mixing equipment and in particular, to a new and improved dissolver for rapidly and efficiently reducing the size of blocks of material, such as bales of rubber, resin, plastic and the like, to form homogeneous solutions and powders. Various dissolving, mixing and comminuting devices have been utilized in the past but they have not been entirely satisfactory, particularly in the production of high viscosity solutions where the amount of solvent is limited, and in the production of dry mixtures with no solvent being used. Prior art mixing and dissolving equipment are shown in U. S. Pat. Nos. 3,244,410; 3,307,793; and 3,342,459.

It is an object of the invention to provide a new and improved dissolver for quickly and efficiently producing homogeneous solutions and powders from blocks of material. A particular object is to provide such a dissolver suitable for use in production of high viscosity solutions with little or no solvent present.

It is an object of the invention to provide such a dissolver including a container, a sweep shaft for driving one or more sweep blades along the container wall, and one or more cutter shafts with a plurality of overlapping cutter blades, and drive means for the sweep shaft and cutter shafts. A particular object is to provide such a dissolver wherein the shafts and blades are positioned within the container to provide a barrier to the blocks of material so that material will be constantly nibbled into smaller pieces and so that large pieces cannot remain in the mixture.

It is a further object of the invention to provide such a dissolver wherein the sweep shaft and sweep blade carry cutting blades and cutting teeth in overlapping relation with the cutter shaft blades. A further object is to provide such a dissolver wherein the drive mechanisms provide for selectively varying the speeds of the shafts and for selectively varying the direction of rotation of the shafts.

Other objects, advantages, features and results will more fully appear in the course of the following description. The drawing merely shows and the description merely describes preferred embodiments of the present invention which are given by way of illustration or example.

Figure 1:
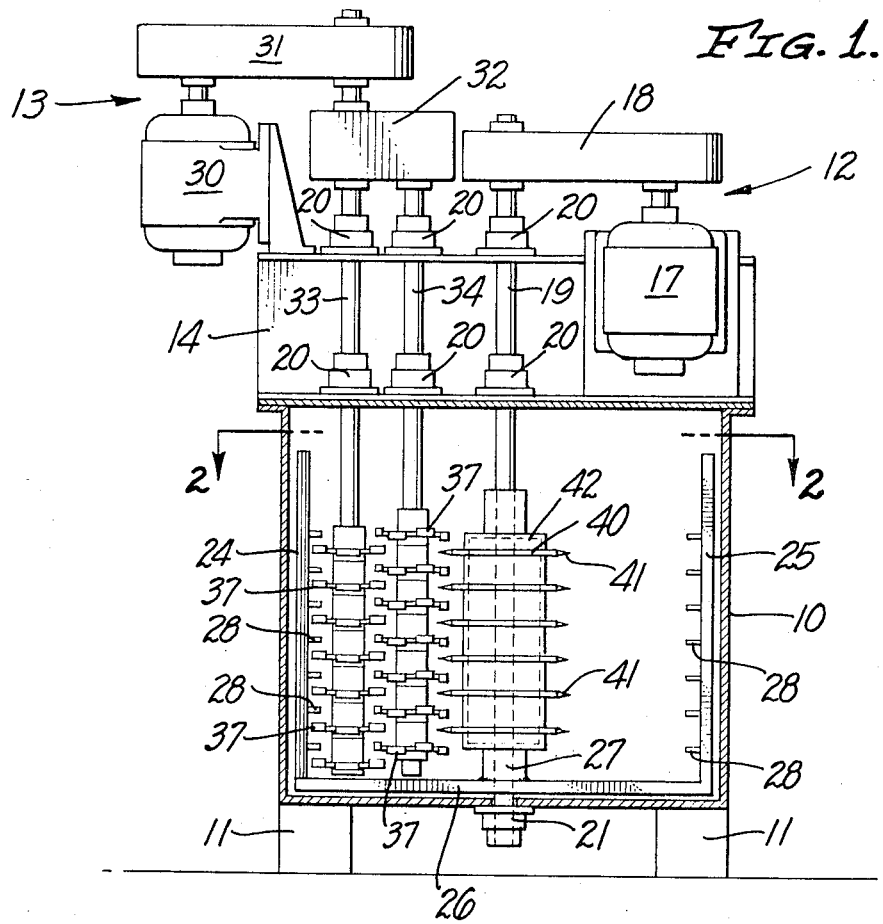
FIG. 1 is a side view partially in section of a dissolver incorporating the presently preferred embodiment of the invention.

The dissolver includes a container 10 resting on feet 11, with drive mechanisms 12, 13 mounted above the container on a suitable support, such as a channel 14.

The drive mechanism 12 includes a motor 17, a variable speed drive unit 18, and a shaft 19, sometimes referred to as the sweep shaft. The shaft 19 may be journalled in bearings 20 carried on the channel 14 and another bearing 21 at the bottom of the container 10.

Blades 24, 25 are mounted on the sweep shaft 19 with an arm 26 and bushing 27, for rotation with the shaft. The sweep shaft 19 is normally rotated counterclockwise as viewed in FIG. 2, and the leading edges of the blades 24, 25 preferably are wedge-shaped, with the blades 24, 25 moving along the inner wall of the container and the arm 26 moving along the bottom of the container as the shaft 19 is rotated by the motor 17. A plurality of teeth 28 may be carried on the inner surfaces of the blades 24, 25.

The drive mechanism 13 includes a motor 30, a variable speed drive unit 31, a transmission unit 32, and shafts 33, 34, these shafts sometimes being referred to as cutter shafts. The shafts 33, 34 may be supported in bearings 20 carried on the channel 14. The two drive mechanisms and the shafts may be installed on a lift mechanism for raising out of and lowering into the container, for changing containers.

A plurality of cutter blades 37 is carried on each of the shafts 33, 34, with the cutter blades 37 spaced from each other and overlapping the cutter blades of the adjacent shaft. Also, the teeth 28 on the sweep blades 24, 25 preferably overlap the cutter blades on the outer cutter shaft 33. The cutter blades 37 may have various configurations, such as simple discs, or impeller vanes such as shown in the previously mentioned U. S. Pat. No. 3,244,410. A preferred form for the cutter blades 37 is shown in the drawing with a sawtooth configuration and with a set alternately to the right and to the left.

The transmission unit 32 preferably is selective to operate the cutter shafts 33, 34 in the same direction and to operate them in opposite directions. Also, the transmission unit 32 preferably is selective to operate the shafts at the same rotational speed and at different rotational speeds.

In the preferred embodiment, a plurality of cutter blades 40 is provided on the sweep shaft 19, with the blades spaced from each other and in overlapping relation with the blades on the shaft 34. In the preferred embodiment illustrated, each cutter blade 40 comprises a disc with outwardly projecting teeth 41. Also, a core 42 preferably is provided about the shaft 19 to substantially fill the space between the blades 40 about the shaft. A scraper (not shown) may be positioned alongside the core 42 to prevent accumulation of material on the core, if desired.

Figure 2:
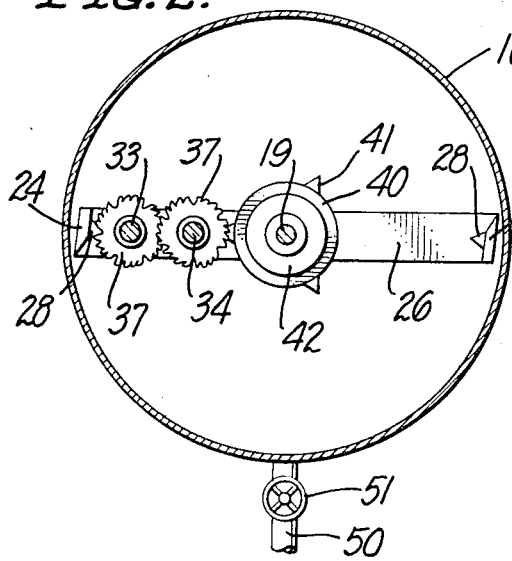
FIG. 2 is a sectional view taken along the line 2—2 of FIG. 1.
Figure 3:
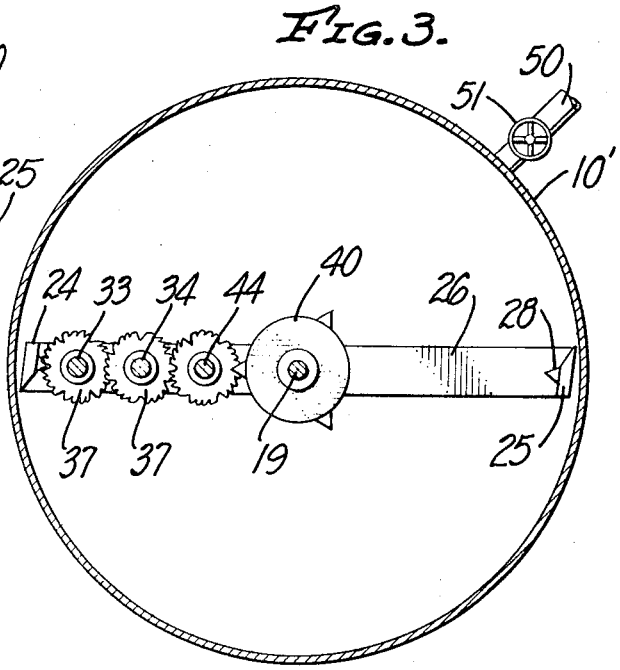
FIG. 3 is a view similar to that of FIG. 2 showing an alternative embodiment of the dissolver.

An alternative embodiment is illustrated in FIG. 3 wherein elements corresponding to those of the embodiment of FIGS. 1 and 2 are identified by the same reference numerals. Three cutter shafts 33, 34, 44 are provided between the sweep shaft 19 and the wall of the larger container 10'. The core 42 may be omitted, and cutter blades such as 37 with teeth along the entire periphery, may be used on the sweep shaft 19 in place of the blades 40, if desired. The drive mechanisms may be the same as those used for the embodiment of FIGS. 1 and 2, with the transmission unit 32 providing another output for the cutter shaft 44.

In operation, the solvent, when used, is placed in the container and the material to be dissolved is dropped in in block form through a suitable opening at the top of the container. Ordinarily, the shafts will be driven at a lower speed initially while the blocks are large. The sweeping motion of the blades 24, 25 tend to bring the blocks into contact with the cutter blades and pieces are continually nibbled off of the larger blocks. The nibbling or comminuting action continues and as the pieces become smaller, the rotational speeds can be increased without overloading the drive motors.

The overlapping cutter blades form a barrier in the container preventing movement of larger pieces of material therethrough as the mass of material in the container is circulated by the action of the sweep blades. This action serves to increase the rapidity with which a homogeneous mixture is achieved and prevents the existence of larger size pieces for any length of time. This operation is particularly significant in the preparation of high viscosity solutions having very little solvent where most of the solution production is due to the comminuting action of the dissolver rather than to the action of the solvent. The container may be emptied through drain line 50 by opening valve 51.

With the sweep shaft and blades rotating counterclockwise and the high-speed cutter shaft and blades rotating clockwise, the bales are caught and forced between the sweep shaft blades at the center of the container and the adjacent high-speed cutter shaft blades rotating clockwise, thus initially ripping a bale to shreds while nibbling action is taking place. On overall movement of material to contact cutting blades, the ability to reverse individually all rotating shafts serves to enhance the rapid reduction in size of material, thereby exposing more surface area to solvent or finer particle size in dry processing. The action caused by shaft counter rotating at different tip and shaft speeds is rapid shredding of all size chunks to complete solution. While the shredding is most marked at the sweep shaft and nearest cutter shaft, it also may occur between each pair of shafts and between the outermost shaft and the sweep blades. The cutter shafts 33, 34 normally are operated at a high rotational rate with respect to the sweep shaft 19, typically with an available speed ratio in the order of about ten to one. At the same time, the lineal speed of the sweep blades 24, 25 approaches that of the cutter blades because of the substantial greater radius. In a typical example, a container 44 inches diameter and 44 inches deep is provided with two cutter shafts with 8-inch diameter cutter blades. The sweep or low-speed shaft is operable at 30 to 90 rpm and the cutter or high-speed shafts are operable at 200 to 1,000 rpm. A dissolver of this nature is suitable for handling blocks of material in the conventional bale size of about 7 × 16 × 30 inches and weighing in the order of 75 pounds.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a dissolver for reducing blocks of material, the combination of:
   a container having a circular wall and a bottom;
   a sweep shaft;
   means for mounting said sweep shaft for rotation within said container;
   at least one sweep blade carried on said sweep shaft for movement along said container wall as the shaft rotates;
   at least one cutter shaft;
   means for mounting said cutter shaft for rotation within said container with an axis of rotation generally parallel to the axis of rotation of said sweep shaft;
   a plurality of cutter blades carried on said cutter shaft, with cutter blades spaced along a shaft;
   first drive means for rotating said sweep shaft; and
   second drive means for rotating said cutter shaft.

2. Apparatus as defined in claim 1 including a plurality of cutter blades carried on said sweep shaft spaced along the shaft in overlapping relation with the blades of the adjacent cutter shaft, with said shafts and overlapping blades providing a barrier to blocks of material between the sweep shaft and container wall.

3. Apparatus as defined in claim 2 including a plurality of inwardly disposed teeth on said sweep blade spaced along the blade in overlapping relation with the blades of the adjacent cutter shaft.

4. Apparatus as defined in claim 2 including a core on said sweep shaft substantially filling the spaces between the sweep shaft cutter blades except that overlapped by the adjacent cutter shaft blades.

5. Apparatus as defined in claim 2 including a sweep arm carried on said sweep shaft for movement along said container bottom as the shaft rotates, with said sweep blade carried at the outer end of said sweep arm.

6. Apparatus as defined in claim 5 wherein said sweep arm includes at least two members extending radially from said sweep shaft to said container wall with a sweep blade at the outer end of each member, and
   including a plurality of inwardly disposed teeth on each sweep blade spaced along the blade in overlapping relation with the blades of the adjacent cutter shaft.

7. Apparatus as defined in claim 1 including:
   a second cutter shaft;
   means for mounting said second cutter shaft for rotation within said container with an axis of rotation generally parallel to the axis of rotation of said sweep shaft; and
   a plurality of cutter blades carried on said second cutter shaft, with cutter blades spaced along the shaft and with the blades of said cutter shafts in overlapping relation.

8. Apparatus as defined in claim 1 wherein each of said first and second drive means includes means for varying the shaft rotation speed.

9. Apparatus as defined in claim 7 wherein said second drive means includes a transmission unit for selectively rotating said cutter shafts in the same direction and in opposite directions.

10. Apparatus as defined in claim 8 wherein said second drive means provides for driving said cutter shaft at a high rotational speed relative to that of said sweep shaft, with an available speed ratio in the order of about ten to one.

* * * * *

UNITED STATES PATENT OFFICE
CERTIFICATE OF CORRECTION

Patent No. 3,746,267    Dated July 17, 1973

Inventor(s) Claude K. Myers and Gary A. Myers

It is certified that error appears in the above-identified patent and that said Letters Patent are hereby corrected as shown below:

Abstract line 5, after "sweep" (second occurrence) insert -- blades along the container wall and one or more high-speed --

Signed and sealed this 18th day of December 1973.

(SEAL)
Attest:

EDWARD M. FLETCHER, JR.
Attesting Officer

RENE D. TEGTMEYER
Acting Commissioner of Patents